Figure 1:
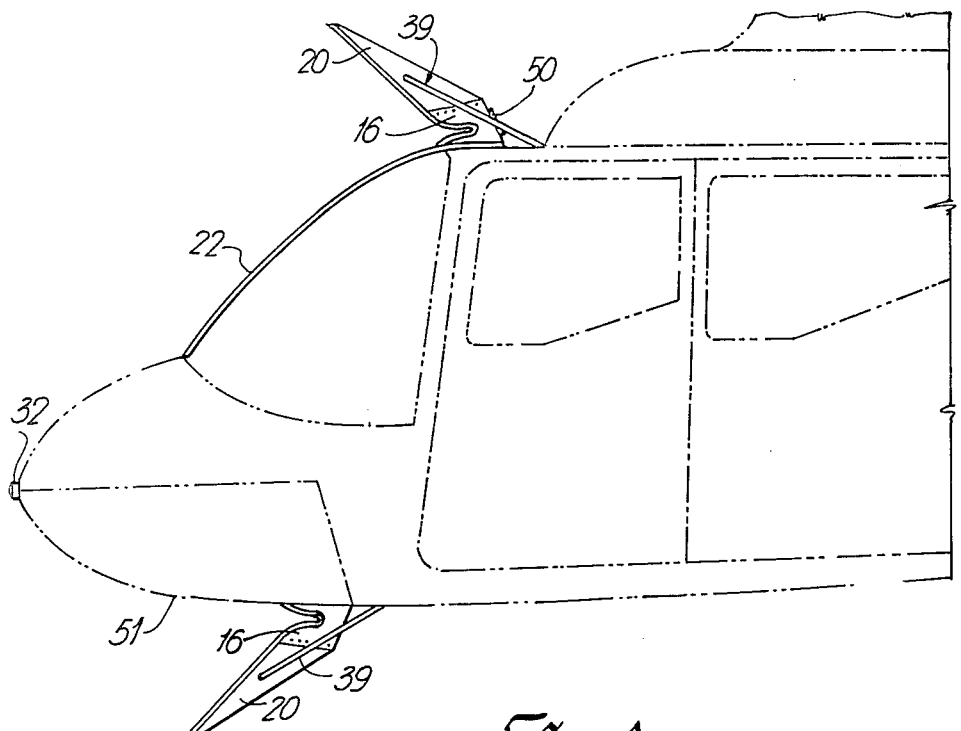

United States Patent [19]

Chan

[11] 4,215,833
[45] Aug. 5, 1980

[54] CABLE-CUTTING DEVICE

[75] Inventor: Nelson Chan, Winnipeg, Canada

[73] Assignee: Her Majesty the Queen in right of Canada, as represented by the Minister of National Defence, Ottawa, Canada

[21] Appl. No.: 3,853

[22] Filed: Jan. 16, 1979

[30] Foreign Application Priority Data

Dec. 7, 1978 [CA] Canada .................................. 317555

[51] Int. Cl.² ............................................ B64C 27/00
[52] U.S. Cl. ........................... 244/17.11; 30/296 R; 30/315
[58] Field of Search ................. 30/296 R, 296 A, 314, 30/315; 244/17.11

[56] References Cited

U.S. PATENT DOCUMENTS

| 27,437 | 3/1860 | Fasig | 30/314 |
|---|---|---|---|
| 764,064 | 7/1904 | Minter | 30/314 |
| 889,458 | 6/1908 | Good | 30/296 R |
| 945,384 | 1/1910 | Fogarty | 30/296 R |
| 1,265,151 | 5/1918 | Wilczek | 30/315 |
| 1,487,587 | 3/1924 | Meleg | 30/315 |
| 1,988,386 | 1/1935 | Komperud | 30/314 |
| 2,908,075 | 10/1959 | Calandra | 30/314 |
| 3,362,289 | 1/1968 | Guin | 89/1 |
| 3,365,798 | 1/1968 | Cunningham | 30/314 |

FOREIGN PATENT DOCUMENTS

| 177992 | 1/1962 | Sweden | 30/314 |
|---|---|---|---|
| 1321623 | 6/1973 | United Kingdom | 30/296 R |

Primary Examiner—Othell M. Simpson
Assistant Examiner—J. T. Zatarga
Attorney, Agent, or Firm—Stevens, Davis, Miller & Mosher

[57] ABSTRACT

The invention disclosed relates to a cable-cutting device for cutting a cable under tension. The device is intended for use in conjunction with aircraft, particularly helicopters to provide reasonable protection to the rotor mast assembly, from cable strikes. The novel device comprises a pair of co-acting cable-cutting edges arranged at a suitable angle to produce a wedge-like mechanical advantage to at least partially cut a cable so that the cable will fail under moderate tension.

29 Claims, 6 Drawing Figures

CABLE-CUTTING DEVICE

This invention relates to a cable-cutting device for an aircraft, and in particular to a cable-cutting device for protecting the main rotor mast and associated linkages of a helicopter from cable strikes.

Helicopter cable strike experience indicates that there is an 80% chance that a cable will strike in the area of the nose. The cable will usually slide-up the windscreen to contact the O.A.T. gage and subsequently the base of the FM antenna. If still intact, the cable will proceed to contact the rotor mast, resulting in loss of helicopter control.

The problem is thus to provide a system that will offer reasonable protection to the windscreen and exposed portion of the rotor mast and associated control linkages to increase aircrew surviveability.

Several potential cable cutting mechanisms have been investigated and tested, and found unsuitable for a variety of reasons including excess weight, complexity and cost. Some of the methods investigated to data include the use of explosive-activated mechanical cutters, electrical cutters and linear-shaped charge cutters. The linear-shaped charge cutters entail the direction of the energy of detonation of a charge through a narrow opening at high velocity across the object to be cut.

Another concept investigated previously employed a complex deflecting structure constructed of tubular steel capable of deflecting cables beneath, and clear of the aircraft, assuming initial cable engagement occurred below the forward apex of the structure. If engagement occurred above the apex, the cables would then have been deflected upward along a knife edge into a V-notch cutter wherein the cutting surfaces were disposed at about 45°. While the capability of the mechanism would have been limited for cable engagements above the apex, it would however, have been capable of coping with cables of almost any size for engagement below the apex where emphasis was placed upon deflecting rather than on cutting. Accordingly, the structure incorporated a high apex; as high above the skids as was possible without jeopardizing other aspects of the design. This gave the mechanism maximum capability to deflect cables beneath the aircraft rather than upwards into the cutter where a load limit greater than about 1,585 lbs. could not have been handled.

It was found that the weight of the structure, about 100 lbs., in addition to sacrificing payload or fuel, would also have created an unacceptable reduction in aircraft performance. Additionally, vibration frequencies created as a result of the structure could have been detrimental to pilot comfort as well as seriously affecting the fatique life of the aircraft structure. Further, the completed structure would not have afforded adequate vision from all seats within the cockpit.

It is therefore an object of the invention to provide a device which offers reasonable protection from cable strikes to the windscreen and exposed portion of the main rotor mast and associated control linkages of a helicopter.

It is a further object of the invention to provide such a device which is relatively maintenance free, light-weight, unobtrusive and inexpensive.

According to the invention, a cable-cutting device for an aircraft, particularly a helicopter, for cutting a cable under tension is provided, comprising a pair of stationary co-acting cable-cutting edges arranged at a suitable angle to produce a wedge-like mechanical advantage while presenting a fresh cutting edge to a cable as it simultaneously engages and advances between said cable-cutting edges toward the junction of said cable-cutting edges, wherein the perpendicular distance between the point of engagement of said cable with said cable-cutting edges and the junction of said cable-cutting edges is sufficient to permit at least partial cutting of said cable before it reaches said junction so that the cable will fail under moderate tension.

It will be noted that this device employs only the energy of motion of the helicopter to accomplish the cable cutting. The mechanical advantage built into the above-described co-acting cutting edges has the effect of multiplying the cutting force, i.e., for every unit of impact force applied there will be a significantly increased cutting force generated.

Figure 2:
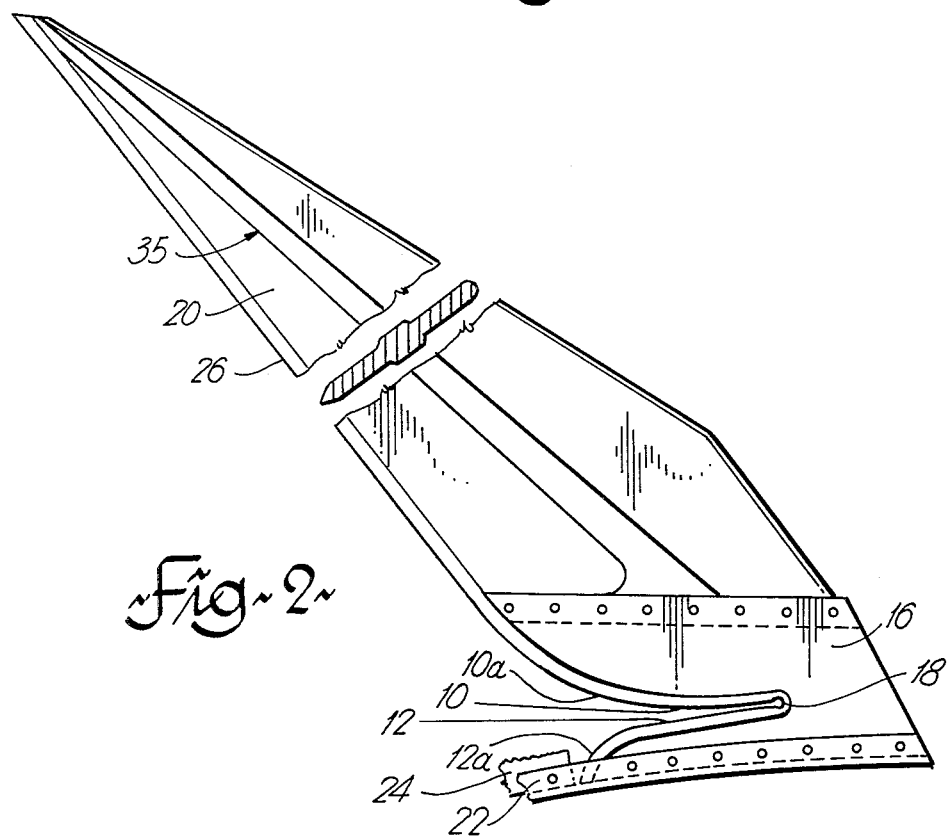
Figure 4:
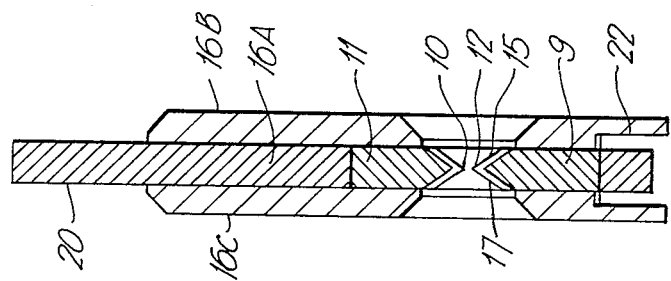
Figure 3:
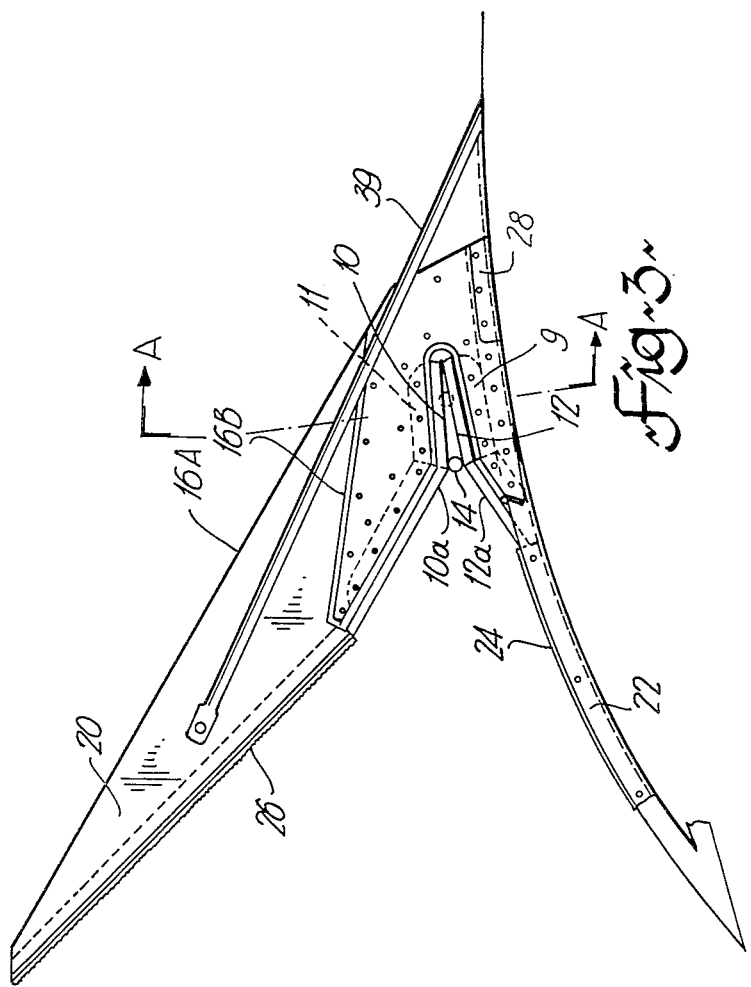
Figure 5:
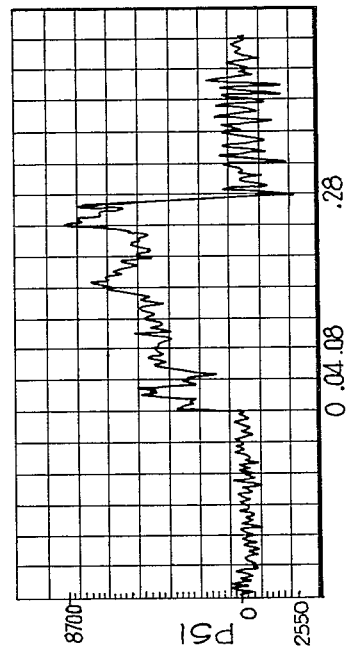
Figure 6:
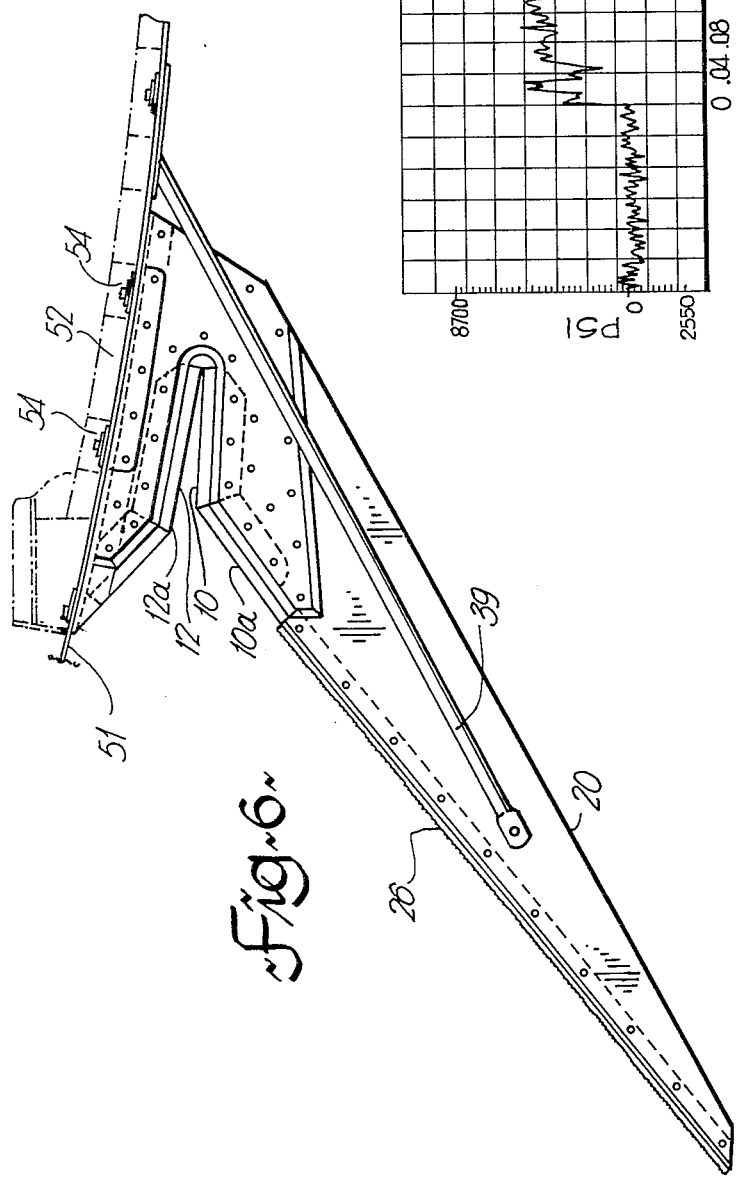

In the drawing which serves to illustrate embodiments of the invention,

FIG. 1 is a side elevation, partly in section, of the fore-end of a CH 136 Kiowa helicopter, including cable-cutting devices according to the invention, mounted thereon, FIG. 2 is a side elevation of one embodiment of a cutting device according to the invention, illustrating its installation, FIG. 3 is a side elevation of an other embodiment of the cutting device according to the invention, FIG. 4 is a front elevation in section, taken along A—A in FIG. 3, illustrating the relationship of the cutting edges according to the invention, FIG. 5 is a graphical record of a typical strain gauge reading made during testing of the cutting device according to the invention as illustrated in FIG. 2, and FIG. 6 is a side elevation, partly in section, illustrating a cutting device according to the invention adapted for mounting on the undercarriage of an aircraft.

Referring to the drawing, the novel-cable-cutting device comprises a pair of stationary co-acting cable-cutting edges 10 and 12 arranged at a suitable angle, such that a fresh cutting edge is presented to a cable 14 as it engages and advances between cable-cutting edges 10 and 12 toward the junction thereof. The edges 10 and 12 are preferably arranged in the same plane. If the edges are off-set, problems could occur as a result of higher stress levels which could cause structural damage to the aircraft. This "shearing" type of cutting action was tried previously without success. A bubble 18 may be included at the junction of edges 10 and 12, as a stress-relieving mechanism.

In the embodiment illustrated in FIG. 2, the cutting edges 10 and 12 are conveniently machined in an integral jaw member 16. Alternatively, as seen in FIG. 3, the cutting edges 10 and 12 may be separate elements mechanically fastened to the jaw member 16.

In the FIG. 2 embodiment, the jaw member 16 is constructed of AISI 8620 or any other alloy steel which exhibits a good combination of wear resistance, toughness and stability and is capable of case hardening to the required hardness. In this case, the cutting edges only are carburized in a conventional manner to the required hardness, i.e., about 56–62 Rc Rockwell hardness. It is important not to harden the entire jaw member, as the resulting brittleness can be detrimental.

In the FIG. 3 embodiment, the jaw member is a bonded and mechanically fastened three piece assembly constructed of a suitable high-strength, light-weight material such as aluminum or aluminum alloys. 7075-T6 aluminum alloy is preferred. As best seen in FIG. 4, the centre piece 16A is shaped in such a manner that when it is assembled with the side pieces 16B and 16C grooves will be provided for accepting blades 9 and 11 which carry as integral parts the cutting edges 12 and 10, respectively. The upper portion of the centre piece 16A serves as the cable deflecting element, as will be apparent hereinafter. The centre piece 16A is conveniently about ⅜" in thickness and the side pieces 16B and 16C are about ¼" thick. The blades 9 and 11 are made of Cromoloy ® (A2) (Atlas Steels Company) or any other quality tool steel, heat treated to the desired hardness as discussed above. The blades 9 and 11 are then mechanically fastened through the jaw members 16B and 16C. This type of separate blade arrangement facilitates replacement of the cutting edges.

Referring again to FIG. 4, it will be seen that the cutting edges 10 and 12 are triangular in section, the sides of which 15 and 17 are disposed at an angle of about 60°±15°.

The wedge-like cutting action developed by converging blades of this configuration and material, symmetrically disposed about the plane of convergency, i.e. the plane containing a line bisecting the apex angle, is considered to provide the optimum combination of "sharpness" and strength required to cut through the cables most prevalently used by hydro-electric, telephone and military authorities as will be apparent hereinafter.

Since cable strikes generally occur during tactical low-level nap-of-the-earth (NOE) flights in the rural or outlying areas, it was decided that the cables frequently used in these areas be closely examined. Table 1 provides a listing of the cables involved. This information was furnished by the Manitoba Hydro and Manitoba Telephone System and may be considered typical of the Canadian environment.

It can readily be seen from Table I that having eliminated the "down guy" due to its attitude of stringing, a windscreen to roof protector/cutter should handle most head-on strike situations with substantially horizontally strung cables if it were designed to sever a 0.38" diameter steel seven strand cable having an ultimate tensile strength (U.T.S.) of about 11,100 lbs. as typified by the 10 M carrier cable.

TABLE I

| APPLICATION | CABLE IDENT. | BASIC CONSTRUCTION | APPROXIMATE DIAMETER (INCHES) | ULTIMATE TENSILE STRENGTH (LBS) |
|---|---|---|---|---|
| HYDRO | 2ACSR | 6AL/1 steel strands bare | .312 | 2,780 |
|  | Shrike | 3AL/4 steel strands bare | .312 | 6,420 |
|  | 8 (3/13) | 3 steel strands bare | .187 | 2,915 |
|  | Service Cables | Multi-aluminum strands | Various | 1,835 to 3,490 |
|  | Head Guy | 7 steel strands bare | .281 | 8,450 |
|  | Down Guy | 7 steel strands bare | .438 | 17,300 |
| TELEPHONE | 100 pair | 200-24 gauge insulated copper wires protected |  |  |
|  | 24 gauge | in aluminum and polyethylene shields | 1.12 | See Note 1 |
|  | 100 pair | 200-19 gauge insulated copper wires protected |  |  |
|  | 19 gauge | in aluminum and polyethylene shields | 1.50 | See Note 1 |
|  | 5M carrier | 7 strand steel bare | Unknown | 5,000 |
|  | 10M carrier | 7 strand steel bare | .38 | 11,100 |

NOTE:
(1)UTS is unknown but these cables are relatively soft and can be handled with a hand cutter.

An explanation of the basic design philosophy follows:

Consider the two converging co-acting cutting edges 10 and 12 as the sides of an isosceles triangle, the base of which is formed by the gap at the widest part of the opening between said edges. Thus, a cable will simultaneously engage the co-acting cutting edges 10 and 12. It will be seen that the length of said base has been preferably determined by the diameter of the 10 M "objective cable" i.e. 0.37 inches. The perpendicular distance from the base to the apex of the triangle, preferably about three inches represents a compromise between mechanical advantage and space available.

The mechanical advantage may be calculated by dividing said perpendicular distance by the length of the base. The sliding friction component is considered to be negligible due to the sharpness and surface finish i.e. hardness of the cutting edges.

FIGS. 2 and 3 show that the triangle, described above, has 0.37" base and said perpendicular distance is about 3". This provides a mechanical advantage of approximately 8:1, i.e., for every 100 lbs. of impact force there is a potential of approximately 800 lbs. cutting force. The apex angle $\theta$ for this triangle is approximately 7°. To decrease this angle and thus improve cutting efficiency would require lengthening the cutter or reducing the size of the objective cable. It is envisaged that the angle $\theta$ is usefully variable in a range of 5°–10°. For a 10° angle, the perpendicular distance would be about 2" and the mechanical advantage about 5.4:1. For a 5° angle, the perpendicular distance about 4" and the mechanical advantage about 10.8:1.

The efficiency of the cutter is based on the speed of the cutting action, i.e., the strands of the cable must be rapidly cut or notched to such an extent that they will fail under moderate tension. If rapid cutting does not occur, the tension load will build up to such a degree that structural damage will take place. Hence the "mechanical advantage" created by the converging coacting cutting edges is of utmost importance for the cutting of heavier cables. By way of further explanation; (due to the weight of the suspended span) the cable at rest has a residual tension to which is added the tension due to the impacting helicopter so that the cable must be rapidly weakened to reduce the cable failure tension load sufficiently to ensure cable failure prior to structural failure of the airframe.

In order to examine cutter efficiency, i.e., load vs time, a number of strain gauges were mounted on a cutter assembly as will be discussed hereinafter.

As seen in FIGS. 2 and 3, the cutting edges 10 and 12 are extended further away from the apex of said triangle, to define diverging extensions 10a and 12a, to accommodate and sever large diameter cables up to and including 1.5" diameter multi-conductor telephone cables.

These cables are made up of relatively weak materials and are capable of being cut by co-acting extensions 10a and 12a at a much less acute included angle; e.g., 65° is shown on FIG. 3. This wider angle portion also functions as a guide to ensure that small, strong cables will enter the narrower, more effective portion of the cutter i.e. between the edges 10 and 12.

It shall be noted that the extended diverging cutting edges 10a and 12a are also effective for severing cables that, because of their small size or weak construction (e.g. copper or aluminum strands), do not require the wedge-like cutting action but rather a cut by a brief, sliding contact with a single edge.

A cable deflecting means is provided for deflecting a cable which would ordinarily strike the windscreen or main rotor shaft, into engagement with the co-acting cable-cutting edges 10 and 12 to sever the cable.

The cable deflecting means comprises first and second cable deflecting members, the first member comprising a cable deflecting element 22 in the form of a one-piece U-shaped channel extrusion, conveniently of aluminum. This element is tied to the existing cockpit structure below the windscreen, fastened to the windscreen center post support following the contour of the windscreen, then curved to run along the roof of the helicopter and terminating at a suitable structural point.

The cable deflecting element 22 may include an abrasive or cutting edge. The abrasive edge may be provided by a fine, tempered saw-toothed bandsaw blade 24 mechanically fastened in the U-shaped channel. The saw blade is preferably an Imperial Bi-metal ® blade as described in U.S. Pat. No. 3,315,548. The blade is arranged to provide normal cutting action in the upward direction. As seen in FIG. 3, the saw blade 24 is arranged to provide a smoother transition to the cutting edge 12 than is the case with the FIG. 2 embodiment, although in the experiments discussed hereinafter, this did not present a problem. The first cable deflecting member thus provides protection for the flimsy windscreen center post. It also helps to guide the cable(s) into the mechanical cutter and in the process inflict as much damage to the cable(s) as possible before entering the co-acting cutting edges 10 and 12. In fact, in the experiments which follow, some of the weaker cables were severed upon contact with the saw-tooth blade 24.

The second cable deflecting member is a cable deflecting element 20 which is rigidly mechanically fastened to the jaw member 16 in a conventional manner as shown in FIG. 2. In the FIG. 3 embodiment the deflecting member 20 is an integral part of the centre piece of the jaw member 16A. The deflector 20 is thus upstanding from the jaw member 16 and 16A and is disposed substantially perpendicular to the plane of the helicopter roof. The element 20 includes a leading cable-deflecting edge 26, which may be shaped or treated to inflict damage to a cable, arranged at an angle of about 45° to the horizontal and being of sufficient height above the helicopter roof to contact a cable entering the space above the roof and below the main rotor disc, and to deflect it into engagement with the cutting edges 10 and 12. As seen in FIG. 3, the edge 26 may comprise a saw tooth blade mechanically fastened to the deflector by conventional means. In this embodiment the cutting teeth are arranged for normal cutting action in the upward direction so that should the aircraft drop e.g. during attempted cable avoidance the cable may move upwardly on the cutting edge 26 to inflict as much damage as possible to the cable. It will be noted that a smooth transition from the cable deflecting edge 26 to the cable-cutting edge 10 is provided. The deflecting element 20 of the FIG. 2 embodiment is conveniently constructed of high-strength aluminum. The same material as used for the jaw member 16A may be conveniently employed.

As thus seen in FIG. 3, additional support for the upstanding deflector element 20 is provided by a support plate 28 rigidly fixed to the helicopter roof and support struts 39 disposed at an angle of about 30° to the element 20, connecting the elements 20 and 28. Stainless steel tubing ⅜" in diameter was found to be a suitable material for the struts 39. The side struts must of course be positioned so that they will not likely impede the progress of cables entering between the co-acting cable-cutting edges 10 and 12.

The total weight of the cutting device and deflecting means in either the FIG. 2 or FIG. 3 embodiment is about 8 lb.

Referring again to FIG. 3, it will be seen that in this embodiment, leading separate cutting edge portions 10a and 12a diverge substantially from each other to allow for larger diameter cables and to facilitate entrance of a cable between the more efficient co-acting cable cutting edges 10 and 12.

It was found in the experiments which follow that in some cases, when using the embodiment of FIG. 2, the cable tended to move up and down on the cutting surface 26 in a sawing fashion until the cable broke. The FIG. 3 embodiment was designed to minimize this possibility. If this had happened with high-strength 10 M cables, structural damage may have occurred.

The deflector element 20 may include a machined rib 35 (FIG. 2) for increased lateral stability. However, in the experimental results which follow, the 10 M strain gauge readings indicate that additional support is not required.

By way of further explanation, the 45° angle of the deflecting element 20 to the horizontal is a compromise. Ideally, the element 20 should be arranged at a smaller angle i.e. about 30°. However if this was done, the length of the deflector would have to be increased to provide the same degree of protection for the rotor mast. Support of a lengthened deflector 20 would be difficult and resultant increase in weight would not be justified. Moreover, in flight, the rotor blades tilt downward and must not strike the tip of the deflecting element 20, so that depending upon the type of aircraft being fitted, the configuration of the element 20 must be adjusted. Since the rotor blade must safely clear the deflecting element 20, there is a small gap wherein the rotor mast cannot be protected. A study of the geometry involved reveals that this unprotected gap increases in size if the deflector 20 is moved forward.

The cable-cutting device according to the invention was first tested in a static drop test using 90 lbs. of dead weight. The tests indicated that "objective" 10 M carrier cable, 0.38" in diameter, 7 steel strands and 11,100 lbs. tensile strength, would be broken by a 3,000 lbs. helicopter moving at a forward speed of about 7 knots, the cutter approaching the cable at about 90°.

Simulated cable-strike tests were then conducted to optimize the cutter/deflector size, shape and construction, specifically for the Canadian Forces CH136 helicopters.

In these experiments, a cutter/deflector mounted Kiowa cabin section was appropriately secured to a truck bed for use as a test vehicle. The test vehicle was driven under suitably substantially horizontally suspended wires to determine the cutter/deflector capability and fuselage structural integrity. A brief description of the major components involves is as follows:

Test Vehicle

The cabin section from "A" category crash Kiowa Helicopter S/N 136266 equipped with the test cutter/deflector was anchored to a 3 ton flat bed truck through the landing gear fittings and the main beam with an appropriate steel structure.

Instrumentation

Strain gauges were used to measure the wire strike loads. High speed cameras were employed to record the behaviour of the wires during the deflection, engagement and post cutting phases of the operation.

TABLE II

| Actual Test Sequence | Scheduled Test Sequence | Test Sample(s) | Total Rated U.T.S. (LBS) | Wire Position | Cut Angle (DEG) | Vehicle Speed (MPH) | REMARKS |
|---|---|---|---|---|---|---|---|
| 1 | 1 | 125 DIA MIL-C-1511 | 2000 | Cutter Height | 90 | 5 | Check Instrumentation, Camera Installation, |
| 2 | 2 | 125 DIA MIL-C-1511 | 2000 | Cutter Height | 90 | 15 | Test set-up and Test Procedures |
| 3 | 3 | 125 DIA MIL-C-1511 | 2000 | Cutter Height | 90 | 30 | |
| 4 | 4 | 2 ACSR | 2780 | Cutter Height | 90 | 5 | Center strand pulled out of wire clamp. Nicked cutter |
| 5 | 5 | 2 ACSR | 2780 | Cutter Height | 90 | 15 | |
| 6 | 6 | 2 ACSR | 2780 | Cutter Height | 90 | 30 | No undue strain observed |
| 7 | 22 | 10M | 11,100 | Cutter Height | 90 | 15 | Total time to cut cable is .28 seconds. |
| 8 | 9 | Shrike | 6420 | Cutter Height | 90 | 30 | |
| 9 | 8 | Shrike | 6420 | Cutter Height | 90 | 15 | |
| 10 | 10 | 125 DIA MIL-C-1511 | 2000 | Cutter Height | 75 | 15 | |
| 11 | 11 | 2 ACSR | 2780 | Cutter Height | 75 | 15 | No ground camera. |
| 12 | 12 | Shrike | 6420 | Cutter Height | 75 | 15 | |
| 13 | 13 | Two Span MIL-C-1511 | 4000 | Cutter Height | 90 | 15 | |
| 14 | 14 | Two Span 2 ACSR | 5560 | Cutter Height | 90 | 15 | |
| 15 | 15 | 2 ACSR | 2780 | Cockpit Nose Height | 90 | 15 | No cutter on lower deflector. |
| 16 | 16 | 2 ACSR | 2780 | Cockpit Nose Height - with windscreen cutting edge installed. | 90 | 15 | Wire cut on contract of cutting edge. |
| 17 | 17 | 2 ACSR | 2780 | Cockpit Nose Height - with Windscreen cutting edge installed. | 75 | 15 | Wire severely chafed by cutting edge. Failed at chafted point |
| 18 | 18 | 2 ACSR | 2780 | Cockpit Nose Height | 75 | 15 | No cutter on lower deflector. Centre strand pulled out of wire clamp. |
| 19 | 19 | Three Span MIL-C-1511 | 6000 | Cutter Height | 90 | 15 | |
| 20 | 26 | 2 ACSR | 2786 | Middle of Upper Deflector Height | 90 | 15 | Wire cut by deflector. |
| 21 | 27 | 2 ACSR | 2780 | Upper Deflector Tip Height | 90 | 15 | Centre strand pulled out of wire clamp. Wire cut by deflector. |
| 22 | 28 | 2 ACSR | 2780 | Upper Deflector Tip Height | 75 | 15 | Centre strand pulled out of wire clamp. Wire cut by deflector. |
| 23 | 20 | Three Span 2 ACSR | 8340 | Cutter Height | 90 | 15 | Cutter changed prior to this test. |
| 24 | 21 | 100 PR. 26 GA. | — | Cutter Height | 90 | 15 | Cable severed on contact with cutter. Easy cut. |
| 25 | 23 | Two Span | 12,840 | Cutter Height | 90 | 15 | Crisp sequential cut |

TABLE II-continued

| Actual Test Sequence | Scheduled Test Sequence | Test Sample(s) | Total Rated U.T.S. (LBS) | Wire Position | Cut Angle (DEG) | Vehicle Speed (MPH) | REMARKS |
|---|---|---|---|---|---|---|---|
| | | Shrike | | | | | observed. |

The experiments revealed that all cables were severed shortly after contact with the cutting assembly according to the invention (i.e. the FIG. 2 embodiment). Some of the lower tensile strength cables were severed by the upper and lower deflectors (see Table II, tests 16, 17, 20, 21 and 22). All cables reaching the cutting device were quickly severed including the objective 10 M cable (test 7) and the Shrike 6420 lb. tensile cable (tests 8, 9 and 12). Multiple cable strikes were also quickly and efficiently disposed of by the cutting device (tests 13, 14, 19, 23 and 25). The latter tests clearly showed that the multiple cables were cut in sequence.

Referring again to the cutter efficiency, reference is made to FIG. 5 which is a graph illustrating a strain gauge reading, the particular strain gauge 50 being mounted on the back of the jaw member 16 i.e. the area where maximum strain should occur during the cutting action. It is seen from the graph i.e. the strip chart recording of the strain gauge reading, that when the cable (a 10 M cable—see test No. 7, Table II) engages the cutting edges the range of strain recorded represents stress levels ranging from 8700 lb/in.$^2$ compression to 2100 lb./in.$^2$ tension in the jaw member 16. This is considered to be a low stress level and indicates that efficient cutting action took place with low loads imposed on the airframe. In this test the duration of strain, indicating cutting time, is 0.28 seconds, which confirms that efficient cutting action took place. Other strain gauges mounted on deflectors, struts and airframe reinforcements indicated stress levels from 4,000/lb/sq. in. compression to 9.000 lb./sq. in. tension, well within the capabilities of the materials used.

In operation, with reference to FIG. 1, a cable striking the nose of the helicopter above its apex 32 will tend to move up the nose into contact with the first cable deflecting element 22 and subsequently into engagement with the jaw member 16 carrying the cable-cutting edges.

A cable entering the space between the cable-cutting means and the top of the main rotor shaft will strike the second cable deflecting element 20 and be deflected into engagement with the jaw member 16 and hence the cutting edges. Low strength, small diameter cables are often severed, during test, upon contact with the abrasive or cutting edges 24 and 26 carried by elements 22 and 20, respectively i.e. before entering the jaw member 16.

It is also contemplated by applicant that a similar cutter assembly be installed on the underside of the helicopter to reduce the hazard of cable strikes occurring below the apex of the nose, on the undercarriage.

As best seen in FIG. 6, a similar cable-cutting device to that of FIG. 3 is shown rigidly mechanically fastened to the underside of the nose 51 of a helicopter to protect the skids (not shown) from cable strikes. The configuration of the deflector 20 is slightly narrower, the geometry being modified to suit the location. It will also be noted that the cable cutting edge 12 has been extended at 12a to facilitate guiding of a cable striking surfaces 26 or 10a into engagement with the coacting cable cutting edges 10 and 12. The total weight of this cutting device and deflecting means is about 5–6 lb.

A thin coating of a suitable rubber material may be coated onto the sharp edges to minimize accidental injury to personnel. The coating may be applied by conventional techniques such as molding, spraying and brushing. The rubber coating should be resistant to aircraft fuels, oil, water and weather aging. Suitable materials include Buna-N rubber and polysulphide coating compounds. The principle behind the coating is that the coating will quickly break down under pressure to expose the sharp cutting surfaces, while affording protection against accidental injury during incidental contact.

It will be appreciated by those skilled in the art that the novel cable-cutting device has been illustrated in conjunction with the protection of a single rotor-type helicopter. It is also envisaged that the novel devices may be adapted for use with twin-rotor type helicopters e.g. the Canadian Forces CH-147 and CH-113A i.e. to protect both front and rear rotors and their undercarriages.

The embodiments of the invention in which an exclusive property or privilege is claimed are defined as follows:

1. In combination with an aircraft, a safety device for protecting the aircraft, when airborne, from cable strikes by horizontally strung cables under tension, said device comprising a pair of stationary co-planar co-acting cable-cutting edges arranged at a suitable angle to each other to produce a wedge-like mechanical advantage while presenting a fresh cutting edge to a cable as it simultaneously engages and advances between said cable-cutting edges toward the junction of said cable-cutting edges, the perpendicular distance between the point of engagement of said cable with said cable-cutting edges and the junction of said cable-cutting edges being sufficient to permit at least partial cutting of said cable, due to the energy of motion of the aircraft, before it reaches said junction so that the cable will fail under moderate tension the device being substantially vertically attached to the forward portion of the aircraft with the opening defined by the angled cable cutting edges facing forwardly and the junction thereof being disposed rearwardly of said opening.

2. The combination of claim 1 in which said cable-cutting edges are at an angle of about 5° to 10° to each other.

3. The combination of claim 1 in which said perpendicular distance is about 2 inches to 4 inches.

4. The combination of claim 1 including an extension of each said cutting edge extending forwardly of its respective edge with at least one of said extensions being flared outwardly from a line bisecting the angle between said edges and at a much greater angle to said bisector so as to define a continuous guide path to direct a cable into engagement with said co-acting cable cutting edges.

5. In combination with an aircraft, a safety device for protecting the aircraft, when airborne, from cable strikes by horizontally strung cables under tension, said device comprising a pair of stationary co-planar co-acting cable-cutting edges arranged at an angle of about 5° to 10° to each other to produce a wedge-like mechanical advantage while presenting a fresh cutting edge to a cable as it simultaneously engages and advances between said cable-cutting edges toward the junction of said cable-cutting edges, the perpendicular distance between the point of engagement of said cable with said cable-cutting edges and the junction of said cable-cutting edges being about 2 to 4" to permit at least partial cutting of said cable, due to the energy of motion of the aircraft, before it reaches said junction so that the cable will fail under moderate tension the device being substantially vertically attached to the forward portion of the aircraft with the opening defined by the angled cable cutting edges facing forwardly and the junction thereof being disposed rearwardly of said opening.

6. In combination with an aircraft, a safety device for protecting the aircraft, when airborne, from cable strikes by horizontally strung cables under tension, said device comprising a pair of stationary co-planar co-acting cable-cutting edges made of a suitable alloy steel material, heat treated to about 56–62 Rc Rockwell hardness, bevelled at an angle of about 45° to 75° and arranged at a suitable angle to each other to produce a wedge-like mechanical advantage while presenting a fresh cutting edge to a cable as it simultaneously engages and advances between said cable-cutting edges toward the junction of said cable-cutting edges, the perpendicular distance between the point of engagement of said cable with said cable-cutting edges and the junction of said cable-cutting edges being sufficient to permit at least partial cutting of said cable, due to the energy of motion of the aircraft, before it reaches said junction so that the cable will fail under moderate tension the device being substantially vertically attached to the forward portion of the aircraft with the opening defined by the angled cable cutting edges facing forwardly and the junction thereof being disposed rearwardly of said opening.

7. A combination according to claim 1, 2, or 3, wherein the aircraft is a helicopter.

8. A combination according to claim 4, 5, or 6, wherein the aircraft is a helicopter.

9. In a combination with a helicopter, a safety device for protecting the helicopter, when airborne, from cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges disposed at a suitable angle to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being sufficient to permit at least partial cutting of the cable before it reaches said junction so that the cable will fail under moderate tension due to the energy of motion of the helicopter and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

10. The combination of claim 9 in which said perpendicular distance is about 2 inches to 4 inches.

11. The combination of claim 9 in which said cable cutting edge are at an angle of about 5° to 10° to each other.

12. In combination with a helicopter, a safety device for protecting the helicopter, when airborne, from cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent co-planar co-acting stationary cable cutting edges disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 to 4" to permit sufficient cutting of the cable before it reaches said junction so that the cable will fail under moderate tension due to the energy of motion of the helicopter and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

13. In combination with a helicopter, a safety device for protecting the helicopter, when airborne, from cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges made of a suitable alloy steel material, heat treated to about 56–62 Rc Rockwell hardness, bevelled at an angle of about 45° to 75° and disposed at a suitable angle to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 to 4" to permit sufficient cutting of the cable before it reaches said junction so that the cable will fail under moderate tension due to the energy of motion of the helicopter and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

14. In combination with a helicopter, a safety device for protecting the helicopter, when airborne, from cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges made of a suitable alloy steel material, heat treated to about 56–62 Rc Rockwell hardness, bevelled at an angle of about 45° to 75° and disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being sufficient to permit at least partial cutting of the cable before it reaches said junction so that the cable will fail under moderate tension due to the energy of motion of the helicopter and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

15. The combination of claim 14 in which said perpendicular distance is about 2 to 4 inches.

16. In combination with a helicopter, a safety device for protecting the helicopter, when airborne, from cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent coplanar co-acting stationary cable-cutting edges made of a suitable alloy steel material, heat treated to about 56–62 Rc Rockwell hardness, and disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 inches to 4 inches to permit sufficient cutting of the cable before it reaches said junction so that the cable will fail under moderate tension due to the energy of motion of the helicopter and cable deflecting means operable associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

17. In combination with a helicopter, a safety device for protecting the helicopter, when airborne, from cable strikes by horizontally strung cables under tension, said helicopter comprising a cabin and main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges made of a suitable alloy steel material, heat treated to about 56–62 Rc Rockwell hardness, bevelled at an angle of about 45° to 75° and disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 inches to 4 inches to permit sufficient cutting of the cable before it reaches said junction so that the cable will fail under moderate tension due to the energy of motion of the helicopter and cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

18. In combination with a helicopter, a safety device for protecting the helicoper, when airborne, from cable strikes by horizontally strung cables under tension, said helicopter comprising a cabin and main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges made of a suitable alloy steel material, heat treated to about 56–62 Rc Rockwell hardness, bevelled at an angle of about 45° to 75° and disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 inches to 4 inches to permit sufficient cutting of the cable before it reaches said junction so that the cable will fail under moderate tension due to the energy of motion of the helicopter, an extension of each said cutting edge extending forwardly of its respective edge with at least one of said extensions being flared outwardly from a line bisecting the angle between said edges and at a much greater angle to said bisector so as to define a continuous guide path to direct a cable into engagement with said co-acting cable cutting edges and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges the device being substantially vertically attached to the forward portion of the aircraft with the opening defined by the angled cable cutting edges facing forwardly and the junction thereof being disposed rearwardly of said opening.

19. In combination with a helicopter, a safety device for protecting the helicopter, when airborne, form cable strikes by horizontally strung cables under tension, said helicopter comprising a cabin and a main rotor mast mounted on the roof of said cabin, said device comprising:

cable-cutting means rigidly mounted on said cabin forward of said rotor mast, said cable-cutting means including a pair of convergent co-planar co-acting stationary cable-cutting edges made of a sutiable alloy steel material, heat treated to about 56–62 Rc Rockwell hardness, bevelled at an angle of about 45° to 75° and disposed at an angle of about 5°–10° to each other to produce a wedge-like mechanical advantage while presenting a fresh-cutting edge to a cable as it simultaneously engages said cable-cutting edges and advances between said cable-cutting edges toward the junction of said cable-cutting edges, the perpendicular distance between the point of engagement of said cable with said cable-cutting edges and the junction of said cable-cutting edges being about 2 inches to 4 inches to permit sufficient cutting of the cable before it reaches said junction so that the cable will fail under moderate tension due to the energy of motion of the helicopter, an extension of each said cutting edge extending forwardly of its respective edge with at least one of said extensions being flared outwardly from a line bisecting the angle between said edges and at a much greater angle to said bisector so as to define a continuous guide path to direct a cable into engagement with said co-acting cable cutting edges and, cable deflecting means operably associated with said cable-cutting means, positioned and arranged in the path of a cable striking said helicopter between the apex of the cabin nose and the upwardly protruding portion of the rotor mast, to deflect the cable into engagement with said co-acting cable cutting edges, wherein said cable deflecting means comprises first and second cable-deflecting members, said first cable-deflecting member comprising a cable-deflecting element in the form of a one piece U-shaped channel extrusion of a suitable lightweight material, said U-shaped channel including a fine, tempered saw-toothed band saw blade rigidly fastened therein, arranged to provide normal cutting action in the direction of the cable-cutting means and a substantially smooth transition from said blade to said extension, following the contour of and being rigidly fastened to the cabin between the apex of the cabin nose and said cable-cutting means; said second cable-deflecting member comprising a cable deflecting element rigidly fastened to and being upstanding from said cable-cutting means and arranged at a suitable angle to the horizontal, such that a cable entering the space between the cable-cutting means and said rotor mast, is deflected into engagement with the co-acting cable cutting edges, wherein the leading edge of said second cable-deflecting member includes a slot, and a tempered, fine-toothed bandsaw blade rigidly fastened in said slot, arranged to provide normal cutting action in a direction away from said cable cutting means, and a substantially smooth transition from said blade to said extension, and wherein said second cable-deflecting member is provided with support struts interconnecting said second cable- deflecting member and the helicopter cabin roof structure, to maintain stability during a cable strike, the device being substantially vertically attached to the forward portion of the aircraft with the opening defined by the angled cable cutting edges facing forwardly and the junction thereof being disposed rearwardly of said opening.

20. A combination according to claim 9, wherein the co-acting cutting edges are formed as an integral part of a jaw member.

21. A combination according to claim 20, including a stress-relieving means in the form of a circular cut-out in the throat of said jaw member adjacent the junction of said co-acting cutting edges.

22. A combination according to claim 9, wherein the co-acting cutting edges are carried by separate blade elements rigidly mechanically fastened in a jaw member, said jaw member being made of a suitable high-strength, light-weight material, including stress-relieving means provided by a slight spacing of said co-acting cutting edges adjacent the junction of said edges.

23. A combination according to claim 10, 11, or 12, wherein the co-acting cutting edges are formed as an integral part of a jaw member, including a stress-relieving means in the form of a circular cut-out in the throat of said jaw member adjacent the junction of said co-acting edges.

24. A combination according to claim 13, 14 or 15, wherein the co-acting cutting edges are formed as an integral part of a jaw member, including a stress-relieving means in the form of a circular cut-out in the throat of said jaw member adjacent the junction of said co-acting edges.

25. A combination according to claim 16, 17 or 18, wherein the co-acting cutting edges are formed as an integral part of a jaw member, including a stress-relieving means in the form of a circular cut-out in the throat of said jaw member adjacent the junction of said co-acting edges.

26. A combination according to claim 10, 11 or 12, wherein the co-acting cutting edges are carried by separate blade elements rigidly mechanically fastened in a jaw member, said jaw member being made of a suitable high-strength, light-weight material, including stress-relieving means provided by a slight spacing of said co-acting cutting edges adjacent the junction of said edges.

27. A combination according to claim 13, 14 or 15, wherein the co-acting cutting edges are carried by separate blade elements rigidly mechanically fastened in a jaw member, said jaw member being made of a suitable high-strength, light-weight material, including stress-relieving means provided by a slight spacing of said co-acting cutting edges adjacent the junction of said edges.

28. A combination according to claim 16, 17 or 18, wherein the co-acting cutting edges are carried by separate blade elements rigidly mechanically fastened in a jaw member, said jaw member being made of a suitable high-strength, light-weight material, including stress-relieving means provided by a slight spacing of said co-acting cutting edges adjacent the junction of said edges.

29. A combination according to claim 19, wherein said helicopter includes a split windscreen supported by a central windscreen frame member, wherein said first cable-deflecting member is rigidly fastened to said windscreen frame member.

* * * * *